United States Patent [19]
Weis

[11] Patent Number: 5,374,360
[45] Date of Patent: Dec. 20, 1994

[54] METHOD AND APPARATUS FOR CLEANING A FILTER APPARATUS

[75] Inventor: Ronald J. Weis, South Beloit, Ill.

[73] Assignee: Aqua-Aerobic Systems, Inc., Rockford, Ill.

[21] Appl. No.: 165,959

[22] Filed: Dec. 14, 1993

[51] Int. Cl.$^5$ .................................... B01D 29/68
[52] U.S. Cl. .................... 210/780; 210/107; 210/108; 210/331; 210/332; 210/333.01; 210/408; 210/409; 210/411; 210/791
[58] Field of Search ............... 210/107, 108, 331, 332, 210/333.01, 393, 398, 408, 409, 411, 780, 784, 791

[56] References Cited

U.S. PATENT DOCUMENTS

| | | | |
|---|---|---|---|
| 3,217,882 | 11/1965 | Olgetree | 210/107 |
| 4,064,045 | 12/1977 | Scmidt, Jr. | 210/332 |
| 4,090,965 | 5/1978 | Fuchs | 210/151 |
| 4,639,315 | 1/1987 | Fuchs | 210/333.1 |

Primary Examiner—Matthew O. Savage
Attorney, Agent, or Firm—Vernon J. Pillote

[57] ABSTRACT

A method and apparatus for cleaning a filter apparatus of the type having an atmospherically vented tank, a rotatable filter frame in the tank having filter material thereon providing one or more filter effluent compartments on the filter frame. An influent line supplies liquid containing suspended solids to the tank and a filtered effluent outlet communicates with the filter effluent compartment, and a spray wash device including spray nozzles is operable during a wash cycle to direct high pressure liquid spray at a side of the filter material on the filter frame in a spray zone. An air tight hood is mounted inside the tank and extends above the upper periphery of the filter frame to an open lower end below the spray zone. The hood is vented to atmosphere during a filter time to allow liquid influent in the tank to flow into the hood and immerse the filter frame, and air is supplied to the hood during the wash cycle at a pressure sufficient to pneumatically depress the liquid in the hood to a level below the spray zone.

9 Claims, 1 Drawing Sheet

METHOD AND APPARATUS FOR CLEANING A FILTER APPARATUS

BACKGROUND OF THE INVENTION

In filter apparatus of the type disclosed in U.S. Pat. Nos. 4,090,965 and 4,639,315 web filter material is mounted on a rotatable filter frame to form one or more enclosed filter effluent compartments on the rotatable frame. During filtering, liquid influent containing suspended solids is passed into an influent tank and flows in a filter direction through the filter material into a filter effluent compartment for discharge to an outlet. The filter material on the filter frame is intermittently backwashed by rotating the filter frame past a suction head which is positioned to engage the outer side of the filter material and which is operative to draw filtered liquid from inside the filter effluent compartment through the filter material in a direction opposite the filter direction, to remove and discharge entrapped solids in the backwash water. The above patents also disclose a high pressure spray wash for washing the filter material after a number of backwash operations. The high pressure spray wash includes spray nozzles disposed either inside or outside the filter effluent compartment and arranged to direct high pressure liquid spray at one side of the filter material. However, the high pressure spray wash cannot be effected while the filter material being washed is submerged in liquid and, in the prior filter apparatus of this type, it was necessary to drain down the liquid in the tank to a level sufficient to enable spray washing. This substantially increased the overall time required for a high pressure spray washing of the drum and correspondingly increased the amount of time that the filter apparatus was out of its filtering mode.

SUMMARY OF THE PRESENT INVENTION

In accordance with the present invention, an upper portion of the rotary filter frame is enclosed in an air tight hood inside the tank and extending from above the filter frame to an open lower end below the spray zone. The hood is vented to atmosphere during the filter time in the filter cycle to allow the liquid influent in the tank to flow into the hood and immerse the rotary filter frame, and a gaseous medium such as air is supplied to a hood during the wash time at a pressure sufficient to pneumatically depress the liquid in the hood to a level below the spray zone.

The high pressure liquid spray is preferably directed toward an upper portion of the rotatable filter frame, and the filter frame is rotated relative to the high pressure spray, to uniformly wash the drum.

DETAILED DESCRIPTION

The present invention relates to a method and apparatus for cleaning a filter apparatus of the type disclosed in U.S. Pat. Nos. 4,090,965 and 4,639,315. In general, such filter apparatus include a rotatable filter frame 10 having web filter material F such as filter cloth on some surfaces of the filter frame, and which provides one or more enclosed filter effluent compartments on the filter frame. As disclosed in the aforementioned patents, the web filter material can be mounted on the ends of the filter frame or on an outer periphery of the filter frame, or both if desired. In the embodiment illustrated, the filter material F is mounted on the generally radially extending ends of the filter frame and the filter frame has a relatively short axial length and is sometimes referred to as a disk-type filter apparatus. When the filter material is mounted on the outer periphery of the filter frame as disclosed in the aforementioned patents, the filter frame is formed with a greater axial length. As used herein, the phrase rotary filter apparatus is intended to include rotary filter frames having filter material on the ends of the filter frame or on the outer periphery or both.

Figure 1:
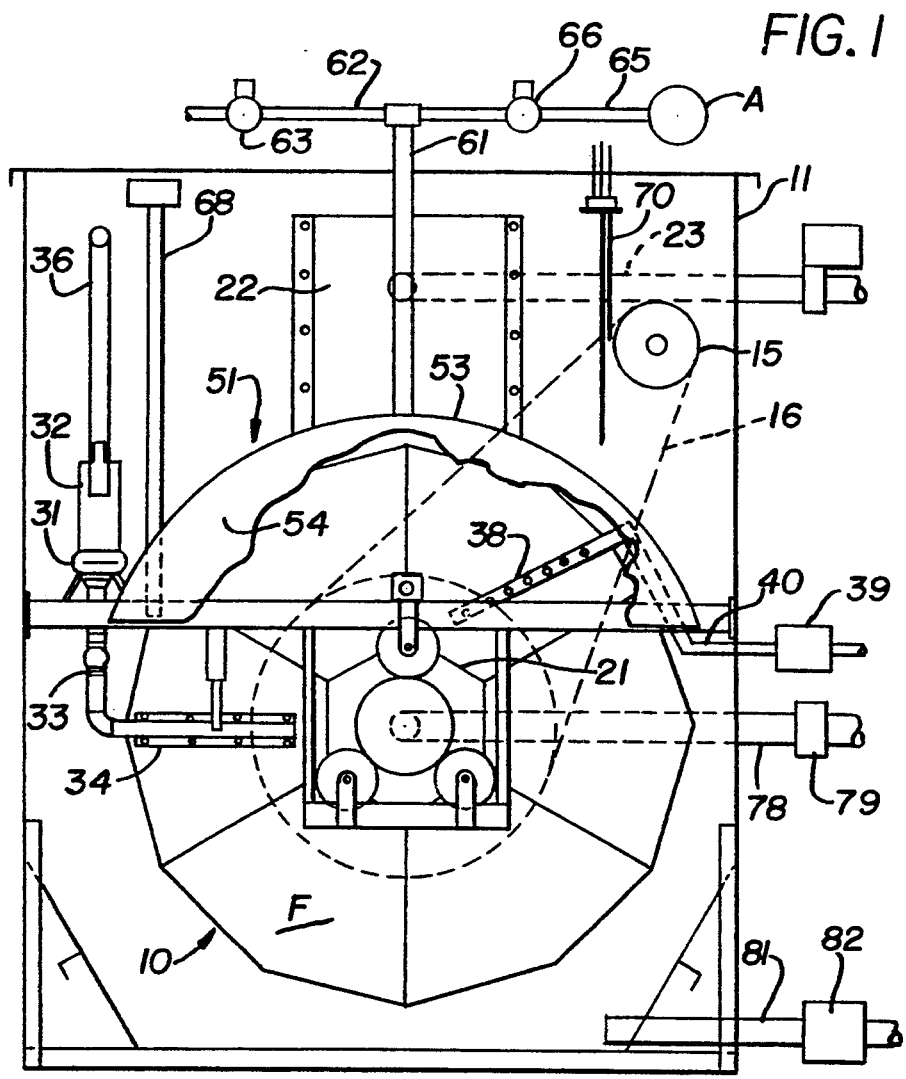
FIG. 1 is a diagrammatic vertical sectional view through a filter apparatus, with parts broken away to illustrate details of construction.

The filter frames are preferably mounted for rotation about a generally horizontal axis within an open top tank or basin 11 and, as shown in FIG. 1, the filter frames are rotated by a motor 15 through a sprocket and chain drive 16. During the normal filter run, liquid influent containing suspended solids is supplied by gravity feed or from a pump (not shown) to an influent supply line 18 controlled by a valve 19. The liquid phase of the influent passes through the web filter material E on the filter frame into the filter effluent compartment inside the filter frame while the solids are filtered out and deposited on the web filter material. Filtered effluent from the filter effluent compartments flows through a hollow drum support 21 and into a riser conduit 22 having a filtered effluent outlet 23 at a level adjacent the uppermost portions of the filter frames. The filter material on the drum are advantageously backwashed by a backwash pump 31 driven by a motor 32. The backwash pump has an inlet connected through a conduit 33 to one or more suction heads 34. In the disclosed apparatus, the web filter material is mounted on the ends of the filter frames, and a suction head 34 is provided at each radial face of the filter frame. When filter cloth is mounted on the periphery of the drum, a suction head would be arranged to engage the periphery of the drum. When the backwash pump is actuated, the suction heads draw filtered water from filter effluent compartment through the filter material in a direction opposite the filter direction, and the backwash pump discharges the entrapped solids with the backwash water to drain through a drain conduit 36. The suction heads 34 are preferably yieldably urged into engagement with the surface of the filter material on the filter frame and the filter material is preferably a flexible material such as cloth which flexibly conforms to the suction head when the backwash pump is actuated.

There are some solids which are not removed from the filter cloth by backwashing alone and the apparatus disclosed in the aforementioned '965 and '315 patents also included a high pressure spray wash for washing the filter, usually after a number of backwash operations. The high pressure spray wash includes spray nozzles 38 arranged to direct the high pressure spray against a surface of the web filter material and a high pressure pump 39 having an outlet connected through distributor pipes 40 to the spray nozzles. In the embodiment illustrated, the spray nozzles 38 are disposed outside the filter frame, with one set of spray nozzles at each radial end of the filter frame. As disclosed in the aforementioned '965 patent, spray nozzles can also be located inside the effluent compartment and arranged to direct high pressure liquid spray in opposite directions against the inner faces of the web filter material.

Figures 2, 3:
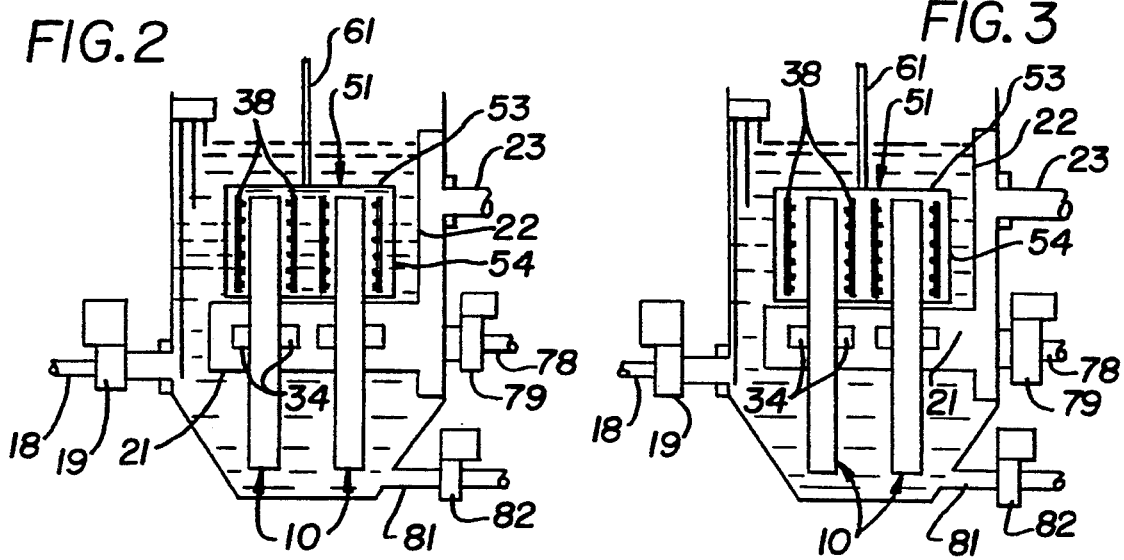
FIG. 2 is a diagrammatic vertical sectional view taken on the plane transverse of the plane of FIG. 1 and illustrating the apparatus in a filter mode.
FIG. 3 is a diagrammatic vertical sectional view illustrating the apparatus in a spray wash mode.

The high pressure spray wash is not effective if it is submerged in liquid and it is therefore necessary to lower the liquid to a level below the high pressure spray nozzles prior to the wash operation. In accordance with the present invention, a hood 51 is mounted inside the tank 11 to extend above the upper periphery of the filter frame and downwardly to a level below the spray zone. In filter apparatus having a plurality of filter frames, the hood is dimensioned to enclose the number of filter frames, for example two, that are to be spray washed at the same time. As shown, the hood has an upper wall 53 that is shaped to conform to the contour of the upper portion of the filter frame or frames with space therebetween to accommodate rotation of the filter frames, and end walls 54 that close the ends of the hood. In the embodiment illustrated, two filter frames are arranged to be spray washed at the same time and the hood encloses the upper portions of both filter frames and the spray nozzles 38 associated with these filter frames. A gaseous fluid such as air is selectively supplied and exhausted from the hood through a pipe 61. Air is exhausted from the hood through a vent outlet 62 controlled by a selectively operable valve 63, to allow influent liquid in the tank to rise upwardly in the hood and immerse the filter frames during the filter time of the filter cycle as shown in FIG. 3. Gaseous fluid such as air under pressure is supplied to the hood from a source designated A through a pipe 65 controlled by a valve 66. When it is desired to lower the liquid level in the hood, vent valve 63 is closed and inlet valve 66 is opened to supply air under pressure to the hood and displace the liquid in the hood until the liquid level is below the spray zone and adjacent the lower end of the hood as shown in FIG. 3. The liquid level in the hood can be sensed by a conventional liquid level sensing device 68 such as an acoustic liquid level sensor or bubbler-type liquid level sensor. The valve 66 can be closed when the liquid level in the hood reaches the desired lower level to maintain the pocket of compressed air under the hood during the spray wash operation. It is also contemplated that the valve 66 could be allowed to remain open during the spray washing and air in excess of that required to fill the hood would then merely bubble upwardly through the tank.

Operation of the filter apparatus is preferably controlled by a microprocessor of the type which can be programmed to initiate and time certain functions such as sludge wasting, backwashing, prewash, wash and rinse phases of the filter cycle, and which can also respond to certain input signals to override the default times for different phases of the filter cycle. For example, while the filter apparatus is in a filter mode, the influent control valve 19 is opened and influent is supplied by gravity feed or by an influent pump (not shown) to the tank at a rate to maintain the liquid level in the tank above the filter frames. Sludge wasting can occur during the filter time 75 by operating a sludge discharge control 82 such as a valve or pump in a sludge discharge line 81, for short times for example 20 seconds at periodic intervals, for example every two hours during the filter time. Backwashing is effected by energizing the backwash pump drive motor 32 and by also energizing the drum drive motor 15 and the microprocessor is preferably programmed to effect backwashing at preselected default times, for example every six hours, with the backwashing continuing for a short time sufficient to allow the drum to rotate through at least one revolution past the backwash heads 34. Backwashing can also be controlled by liquid level sensors 70 that sense a preselected rise in the liquid level in the tank. The microprocessor is also preferably programmed to initiate a high pressure wash cycle which includes a prewash phase, a wash phase and a rinse phase at default time intervals, for example every two or three days. During a prewash phase of the wash cycle, vent valve 63 is closed and air valve 66 is opened to supply air under pressure to the hood and pneumatically depress the liquid level in the hood to a level below the spray nozzles. During the wash phase, the high pressure pump 39 is operated to supply high pressure liquid, preferably clean or filtered water, to the spray nozzles 38 to wash the filter material on the drum while the drum drive motor 15 is energized to rotate the drum past the spray nozzles for at least one revolution. During the rinse phase of the wash cycle, the spray wash is stopped and vent valve 63 is opened to vent the hood and allow the liquid level to rise in the hood. It is also contemplated that liquid in the filter effluent compartments can be passed to drain during the wash and rinse phases through a pipe 78 controlled by valve 79, to cleanse the drums prior to returning to the filter phase of the cycle. Solids that settle to the bottom of the tank are discharged to waste through waste line 81 and valve 82 at selected time intervals during the filter time and also during the wash and rinse times.

The embodiments of the invention in which an exclusive property or privilege is claimed are defined as follows:

1. In a method of cleaning a filter apparatus having an atmospherically vented tank, a rotatable filter frame mounted in the tank and having filter material mounted thereon and providing one or more filter effluent compartments on the filter frame, wherein during a filter time in a filter cycle, liquid influent is supplied to the tank for flow from the tank through the filter material on the filter frame to the filter effluent compartment and filtered liquid is discharged from filter effluent compartment through a filtrate outlet, and wherein the filter material on the filter frame is washed during a wash time in a wash cycle by directing a high pressure liquid spray at one side of the filter material on the filter frame in a spray zone, the improvement comprising: enclosing at least an upper portion of the filter frame with an air tight hood inside the tank and extending from above the filter frame to an open lower end below the spray zone, venting the hood to atmosphere during the filter time in the filter cycle to allow the liquid influent in the tank, to flow into the hood and immerse the filter frame, and supplying gaseous fluid to the hood during the wash time at a pressure sufficient to pneumatically depress the liquid in the hood to a level below the spray zone.

2. The method of claim 1 wherein the filter frame is rotated relative to the high pressure liquid spray during the wash cycle.

3. The method of claim 1 wherein the filter frame is rotated about a horizontal axis relative to the high pressure liquid spray during the wash cycle and the spray zone is above the axis of rotation and below a top of the filter frame.

4. The method of claim 1 wherein the liquid in the tank is maintained at a level above the filtrate outlet during the filter time and during the wash time.

5. The method of claim 1 wherein the filter material on the filter frame is intermittently backwashed during the filter time by operating a suction device at the outer side of the filter frame to draw filtered liquid from the filter effluent compartment in a backwash direction through the filter material.

6. In a filter apparatus including an atmospherically vented tank, a rotatable filter frame having filter material mounted thereon and providing one or more filter effluent compartments on the filter frame, inlet means for supplying liquid containing suspended solids to the tank, a filtered effluent outlet communicating with the filter effluent compartment, spray wash means including spray nozzles operable during a wash time in a wash cycle to direct high pressure liquid spray at one side of the filter material on the filter frame in a spray zone, the improvement comprising: an air tight hood mounted inside the tank extending above the upper periphery of the filter frame to an open lower end below the spray zone, means for supplying liquid to the inlet means and for discharging liquid from the effluent outlet during a filter time, means for venting the hood to atmosphere to allow liquid influent in the tank to flow into the hood and immerse the filter frame during said filter time, and means for supplying air under pressure to the hood at a pressure sufficient to pneumatically depress the liquid in the hood to a level below the spray zone during the wash time.

7. An apparatus according to claim 6 including backwash means having a suction nozzle at the outer side of the filter material on the filter frame for drawing liquid in a backwash direction through the filter material, and means for intermittently operating said backwash means.

8. An apparatus according to claim 6 including means for rotating said filter frame relative to the high pressure liquid spray during the wash cycle.

9. An apparatus according to claim 6 including means for rotating the filter frame about a horizontal axis relative to the spray nozzles during the wash cycle, the spray nozzles being located intermediate the axis of rotation and below the top of the filter frame.

* * * * *